United States Patent
Karri et al.

(10) Patent No.: US 12,321,133 B2
(45) Date of Patent: Jun. 3, 2025

(54) SECURITY FOR DISPLAYED CONFIDENTIAL HOLOGRAPHIC OBJECTS

(71) Applicant: International Business Machines Corporation, Armonk, NY (US)

(72) Inventors: Venkata Vara Prasad Karri, Visakhapatnam (IN); Sarbajit K. Rakshit, Kolkata (IN); Shailendra Moyal, Pune (IN); Akash U. Dhoot, Pune (IN)

(73) Assignee: International Business Machines Corporation, Armonk, NY (US)

( * ) Notice: Subject to any disclaimer, the term of this patent is extended or adjusted under 35 U.S.C. 154(b) by 719 days.

(21) Appl. No.: 17/447,333

(22) Filed: Sep. 10, 2021

(65) Prior Publication Data

US 2023/0084264 A1 Mar. 16, 2023

(51) Int. Cl.
*G03H 1/00* (2006.01)
*G03H 1/22* (2006.01)
*G06F 21/32* (2013.01)

(52) U.S. Cl.
CPC ......... *G03H 1/0011* (2013.01); *G03H 1/2202* (2013.01); *G06F 21/32* (2013.01);
(Continued)

(58) Field of Classification Search
CPC .............. G03H 1/0011; G03H 1/2202; G03H 2001/0088; G03H 2001/2244;
(Continued)

(56) References Cited

U.S. PATENT DOCUMENTS

| 5,740,276 A | 4/1998 | Tomko |
| 9,661,272 B1 | 5/2017 | Daniel |

(Continued)

FOREIGN PATENT DOCUMENTS

| KR | 20200009312 A | 1/2020 |
| WO | 2005034019 A3 | 4/2005 |
| WO | WO-2020016769 A1 * | 1/2020 |

OTHER PUBLICATIONS

Cision PR Newswire, "$4.5 Bn Holographic Imaging Market—Global Outlook and Forecast 2019-2024", Cision, Research and Markets, May 30, 2019, 6 Pages.
(Continued)

*Primary Examiner* — Jeffery A Brier
(74) *Attorney, Agent, or Firm* — Joseph P. Curcuru

(57) ABSTRACT

In an approach to security for displayed confidential holographic objects, one or more computer processors receive a request from a user to display a holographic object in association with a device. One or more computer processors identify content to be moved to the holographic object. One or more computer processors determine the content includes confidential information. One or more computer processors request authentication from the user. One or more computer processors receive the authentication from the user. One or more computer processors create a holographic boundary, where the holographic boundary blocks a view of the holographic object from one or more unauthorized users. One or more computer processors display the holographic boundary. One or more computer processors display the holographic object in association with the device.

17 Claims, 4 Drawing Sheets

(52) U.S. Cl.
CPC .............. *G03H 2001/0088* (2013.01); *G03H 2001/2244* (2013.01)

(58) Field of Classification Search
CPC ......... G03H 1/2294; G03H 2001/2236; G03H 1/2249; G06F 21/32; G06F 21/6245; G06V 40/1312
See application file for complete search history.

(56) References Cited

U.S. PATENT DOCUMENTS

| | | | |
|---|---|---|---|
| 10,175,650 | B2 | 1/2019 | Kline |
| 10,386,787 | B2 | 8/2019 | Kline |
| 10,949,554 | B2 | 3/2021 | Rakshit |
| 2014/0013422 | A1* | 1/2014 | Janus ..................... G06F 21/32 726/19 |
| 2015/0205399 | A1* | 7/2015 | Kim ................... H04M 1/7243 345/175 |
| 2018/0088527 | A1* | 3/2018 | Bostick .................... G09G 5/00 |
| 2019/0080097 | A1* | 3/2019 | Hardee ............. G06F 21/6245 |
| 2020/0026237 | A1 | 1/2020 | Rakshit |
| 2020/0026238 | A1 | 1/2020 | Chatterjee |
| 2020/0026239 | A1 | 1/2020 | Rakshit |

OTHER PUBLICATIONS

Krewson et al., "Holographic Security Key", An IP.com Prior Art Database Technical Disclosure, IP.com No. PCOM000077016D, IP.com Electronic Publication Date: Feb. 24, 2005, 4 Pages.

Lee, Tyler, "Samsung Appears To Be Interested In Smartphone Hologram Technology", Ubergizmo, Aug. 11, 2015, 5 Pages.

Purcher, Jack, "Samsung Invents a Future Smartphone that Could Project Holographic Icons", Patently Mobile, Aug. 11, 2015, 3 Pages.

Sorrel, Charlie, "Camera Reads Fingerprints From a Distance in Seconds", Wired, May 19, 2011, 2 Pages.

Swanson, Sandra, "Fingerprints Go the Distance", MIT Technology Review, Jan. 14, 2011, 14 Pages.

Takeda et al., "Encrypted Sensing Based on Digital Holography for Fingerprint Images", Optics and Photonics Journal, vol. 5, Issue: 01, Jan. 2015, 11 Pages.

"Samsung Plans to Project Holograms from Devices", Triangle Cellular Repair, Aug. 2, 2019, 3 pages.

Soukup et al. "Mobile Hologram Verification with Deep Learning", IPSJ Transactions on Computer Vision and Applications, Mar. 24, 2017, 6 pages.

\* cited by examiner

SECURITY FOR DISPLAYED CONFIDENTIAL HOLOGRAPHIC OBJECTS

BACKGROUND OF THE INVENTION

The present invention relates generally to the field of holography, and more particularly to security for displayed confidential holographic objects.

A hologram may be a photographic recording of a light field and may be used to display a full three-dimensional (3D) image of an object. A hologram may be seen by an observer without the aid of special glasses or other intermediate optics. More specifically, a hologram may be an encoding of a light field as an interference pattern of variations in opacity, density, or surface profile of a medium (e.g., air, holographic film, etc.). When suitably lit, the interference pattern diffracts the light into a reproduction of the original light field, and objects present in the original light field appear to be present in the reproduction, exhibiting visual depth cues such as parallax and perspective that change realistically with a change in the relative position of an observer.

SUMMARY

Embodiments of the present invention disclose a computer-implemented method, a computer program product, and a system for security for displayed confidential holographic objects. The computer-implemented method may include one or more computer processors receiving a request from a user to display a holographic object in association with a device. One or more computer processors identify content to be moved to the holographic object. One or more computer processors determine the content includes confidential information. One or more computer processors request authentication from the user. One or more computer processors receive the authentication from the user. One or more computer processors create a holographic boundary, where the holographic boundary blocks a view of the holographic object from one or more unauthorized users. One or more computer processors display the holographic boundary. One or more computer processors display the holographic object in association with the device.

DETAILED DESCRIPTION

In recent developments in holographic technology, it has been shown that a mobile device, such as a smart phone, can produce a holographic object in midair, above the surface of the display of the device. When the holographic object is displayed in midair, a portion, or all, of the object will be visible by those users with a view to the device. If the holographic object includes some confidential or proprietary information, the user of the device may not want to have the confidential information visible to other users in proximity to the device who are not authorized to view the confidential information. In addition, the user of the device may need to provide an authentication in order to view the holographic object. In recent developments in biometric authentication, it has been shown that a camera-based authentication system can track a fingerprint of a user from a distance such that the user does not need to actually touch a surface to be authenticated by the system.

Embodiments of the present invention recognize that improvements may be made to the security of a displayed holographic object by providing a system that, upon authentication of the user, creates a secondary holographic object that blocks the view of the primary holographic object by unauthorized users in the vicinity of the primary holographic object. Embodiments of the present invention also recognize that efficiency may be gained by providing an authentication system that enables a user to authenticate authorization to view a holographic object without having to touch a device surface. Implementation of embodiments of the invention may take a variety of forms, and exemplary implementation details are discussed subsequently with reference to the Figures.

Figure 1:
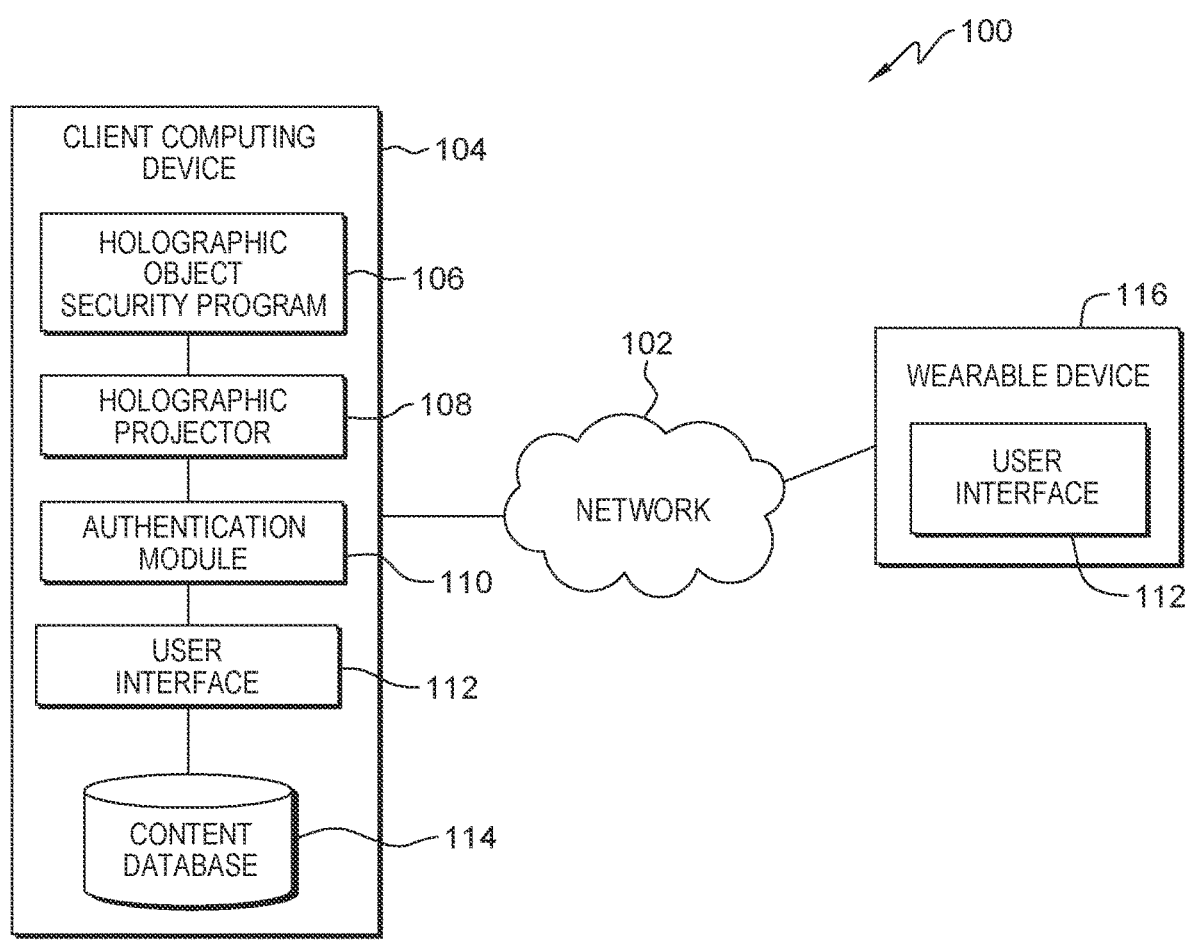
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Client computing device 104 and wearable device 116 can each be one or more of a laptop computer, a tablet computer, a smart phone, smart watch, a smart speaker, or any programmable electronic device capable of communicating with various components and devices within distributed data processing environment 100, via network 102. Client computing device 104 and wearable device 116 may each be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In one embodiment, the wearable computer may be in the form of a head mounted display. The head mounted display may take the form-factor of a pair of glasses. In an embodiment, the wearable computer may be in the form of a smart watch. In an embodiment, client computing device 104 and wearable device 116 may each be integrated into a vehicle of the user. For example, client computing device 104 may include a heads-up display in the windshield of the vehicle. In general, client computing device 104 and wearable device 116 each represents one or more programmable electronic devices or combination of programmable electronic devices capable of executing machine readable program instructions and communicating with other computing devices within distributed data processing environment 100 via a network, such as network 102. Client computing device 104 includes holographic object security program 106, holographic projector 108, authentication module 110, an instance of user interface 112, and content database 114. Wearable device 116 includes an instance of user interface 112.

Holographic object security program 106 enables a user, upon authentication, to view confidential information included in a holographic object while creating a holographic boundary around the holographic object to protect the holographic object from being viewed by surrounding, unauthorized, users. Holographic object security program 106 receives a request for a display of a holographic object from a user. Holographic object security program 106 identifies content within the request to be moved to the holographic object. Holographic object security program 106 determines whether the content includes confidential information. If holographic object security program 106 determines the content does include confidential information, then holographic object security program 106 masks the confidential information. Holographic object security program 106 creates and displays a holographic object with the masked confidential information. Holographic object security program 106 requests and receives authentication from the user. Holographic object security program 106 creates and displays a holographic boundary. Holographic object security program 106 displays the holographic object. Holographic object security program 106 determines power availability and usage of the device that displays the holographic object and determines whether the power is sufficient for the display of the holographic object. If holographic object security program 106 determines the power is not sufficient, then holographic object security program 106 adjusts the display of the holographic object and/or the holographic boundary. Holographic object security program 106 is depicted and described in further detail with respect to FIG. 2, FIG. 3A and FIG. 3B.

Holographic projector 108, as would be recognized by a person of skill in the art, is an apparatus integrated into client computing device 104 which includes the capability of projecting a holographic object in midair above the display of client computing device 104.

Authentication module 110 is one or more of a plurality of software packages used for single or multi-factor authentication of a user prior to display of restricted information. In an embodiment, authentication module 110 uses a fingerprint of the user of client computing device 104 for authentication of the user. In a further embodiment, client computing device 104 is configured with one or more cameras (not shown) that authentication module 110 dynamically focuses to capture an image of a fingerprint of the user and authenticate the user from a distance (i.e., the user is not required to physically touch the device). In the depicted embodiment, authentication module 110 is a stand-alone component. In another embodiment, the function of authentication module 110 is integrated into holographic object security program 106.

User interface 112 provides an interface between holographic object security program 106 on client computing device 104 and a user of client computing device 104 and/or a user of wearable device 116. In one embodiment, user interface 112 is mobile application software. Mobile application software, or an "app," is a computer program designed to run on smart phones, tablet computers and other mobile devices. In one embodiment, user interface 112 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 112 enables a user of client computing device 104 and/or a user of wearable device 116 to input a form of authentication which holographic object security program 106 uses to confirm the user is authorized to view any confidential content included in a holographic object. User interface 112 may also enable a user of client computing device 104 and/or a user of wearable device 116 to access content in content database 114. User interface 112 may also enable a user of client computing device 104 and/or a user of wearable device 116 to interact with holographic object security program 106, for example, receiving suggestions for optimizing power usage.

Content database 114 stores information used and generated by holographic object security program 106. In the depicted embodiment, content database 114 resides on client computing device 104. In another embodiment, content database 114 may reside elsewhere within distributed data processing environment 100, provided that holographic object security program 106 has access to content database 114, for example, via network 102. A database is an organized collection of data. Content database 114 can be implemented with any type of storage device capable of storing data and configuration files that can be accessed and utilized by holographic object security program 106, such as a database server, a hard disk drive, or a flash memory. Content database 114 represents one or more databases that store content that the user of client computing device 104 may want to display as a holographic object.

The present invention may contain various accessible data sources, such as content database 114, that may include personal data, content, or information the user wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Holographic object security program 106 enables the authorized and secure processing of personal data. Holographic object security program 106 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Holographic object security program 106 provides information regarding personal data and the nature (e.g., type, scope, purpose, duration, etc.) of the processing. Holographic object security program 106 provides the user with copies of stored personal data. Holographic object security program 106 allows the correction or completion of incorrect or incomplete personal data. Holographic object security program 106 allows the immediate deletion of personal data.

Figure 2:
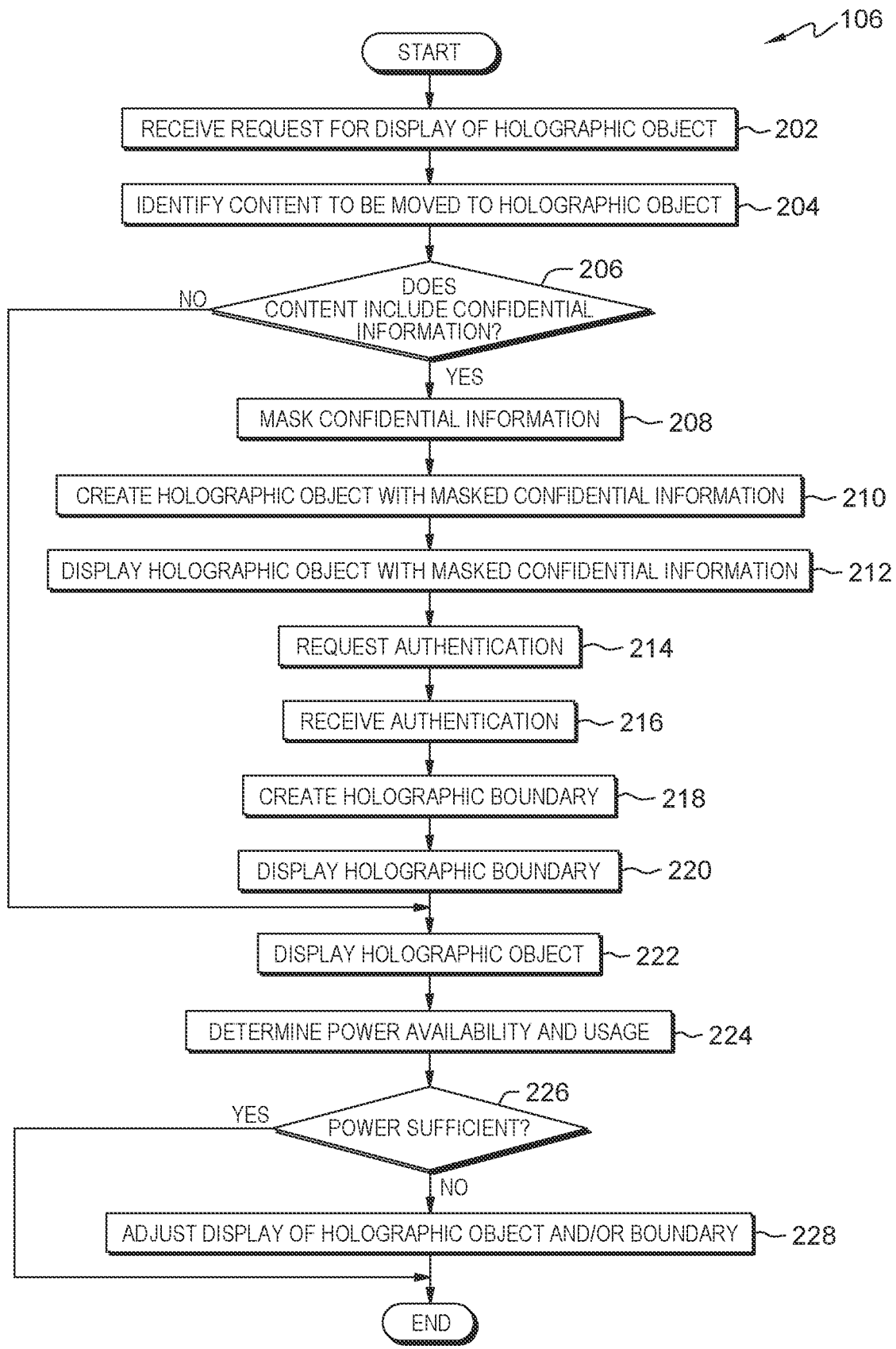
FIG. 2 is a flowchart depicting operational steps of a holographic object security program, on a client computing device within the distributed data processing environment of FIG. 1, for providing security for displayed confidential holographic objects, in accordance with an embodiment of the present invention.

FIG. 2 is a flowchart depicting operational steps of holographic object security program 106, on client computing device 104 within distributed data processing environment 100 of FIG. 1, for providing security for displayed confidential holographic objects, in accordance with an embodiment of the present invention.

Holographic object security program 106 receives a request for a display of a holographic object from a user of client computing device 104 (step 202). In an embodiment, holographic object security program 106 tracks the user's interaction with client computing device 104 and receives a request from the user via user interface 112. For example, the user may click on an icon associated with content stored in content database 114, select an option within user interface 112 that states, "display selected item as a holographic object." When the user selects the option, then holographic object security program 106 receives the request.

Holographic object security program 106 identifies content within the request to be moved to the holographic object (step 204). In an embodiment, holographic object security program 106 identifies the requested content to be moved to the, i.e., displayed as a, holographic object in content database 114. For example, holographic object security program 106 may identify the selected item as a file for a three-dimensional (3D) model of a product in manufacture.

Holographic object security program 106 determines whether the content includes confidential information (decision block 206). In an embodiment, holographic object security program 106 uses one or more natural language processing (NLP) techniques to parse the content to determine whether the content includes any confidential information. For example, holographic object security program 106 may look for words such as confidential, proprietary, classified, private, authorized users only, authentication required, etc., to identify confidential information.

If holographic object security program 106 determines the content does include confidential information ("yes" branch, decision block 206), then holographic object security program 106 masks the confidential information (step 208). In an embodiment where authentication is required to view the confidential information, holographic object security program 106 masks the confidential information in the content such that, once displayed, i.e., moved to the holographic object, the confidential information is not visible in the holographic object. Holographic object security program 106 uses one or more masking techniques known in the art to mask the confidential information, such as blurring, adding texture, etc.

Holographic object security program 106 creates a holographic object with the masked confidential information (step 210). In an embodiment, holographic object security program 106 creates a holographic object using one or more techniques known in the art. Holographic object security program 106 creates the holographic object with the confidential information masked in the previous step.

Holographic object security program 106 displays the holographic object with the masked confidential information (step 212). In an embodiment, holographic object security program 106 displays the holographic object in midair, above the surface of client computing device 104 using holographic projector 108, while masking the confidential information. Thus, although the holographic object is visible, the confidential information cannot be seen by either the user or any surrounding users with a view of the displayed holographic object. In an embodiment, holographic object security program 106 identifies the viewing angle of the user in order to determine the location and position in which to display the holographic object. This step will be discussed further with respect to FIG. 3A.

Holographic object security program 106 requests authentication from the user (step 214). In an embodiment, holographic object security program 106 requests the user to provide authentication of the user via user interface 112 to enable viewing of the masked confidential information. In an embodiment where authentication module 110 includes fingerprint authentication from a distance, holographic object security program 106 requests that the user act as if the user is touching the holographic object in order to provide a fingerprint for authentication module 110 to read. In an embodiment, holographic object security program 106 may request authentication via one or more of a plurality of techniques known in the art. For example, holographic object security program 106 may request the user input a password into user interface 112. In an embodiment, holographic object security program 106 requests multi-factor authentication as an additional security layer. For example, holographic object security program 106 can request both a fingerprint and a signal, such as a beam of light, from wearable device 116 to authorize the user to view the confidential information. In another example, if there are two or more levels of confidentiality in the confidential information, then holographic object security program 106 can request either the fingerprint or the signal from wearable device 116 to unlock the less confidential information, and holographic object security program 106 can request both the fingerprint and the signal from wearable device 116 to unlock the more confidential information.

Holographic object security program 106 receives authentication from the user (step 216). In an embodiment, when the user responds to the request for authentication, whether for a single factor or multi-factor authentication, holographic object security program 106 receives the authentication from the user via user interface 112. In an embodiment, holographic object security program 106 uses authentication module 110 to receive the authentication from the user. In the embodiment, authentication module 110 communicates with holographic object security program 106 to confirm authentication of the user.

Holographic object security program 106 creates a holographic boundary (step 218). In an embodiment, holographic object security program 106 creates a holographic boundary using one or more techniques known in the art. Holographic object security program 106 designs the holographic boundary to block the view of the confidential information by any unauthorized users with a view of the holographic object. In an embodiment, holographic object security program 106 determines the presence of one or more unauthorized users by monitoring the microphone of client computing device 104 and determining whether there are one or more voices present in addition to the voice of the user of client computing device 104, and, if so, from what direction the voices are located. In another embodiment, holographic object security program 106 determines the presence of one or more unauthorized users using one or more cameras associated with an Internet of Things (IoT) platform (not shown) in the vicinity of client computing device 104 to determine the location of one or more users from which holographic object security program 106 did not receive authentication. In a further embodiment, holographic object security program 106 prompts the user, via user interface 112, regarding the presence and/or location of one or more unauthorized users. In yet another embodiment, holographic object security program 106 collaborates with one or more other devices (not shown) within a threshold proximity of client computing device 104 in order to locate the users of the devices.

In an embodiment, holographic object security program 106 can vary the size, shape, texture, and/or thickness of the holographic boundary as appropriate to protect the confidential information included in the displayed holographic object. For example, if the confidential information is text in a small font size, holographic object security program 106 can create a thinner, somewhat transparent holographic boundary since that would be sufficient to block the text. In another example, if the shape of the holographic object is the confidential information, then holographic object security program 106 can create an opaque holographic boundary that is larger than the holographic object in height and width, such that the shape of the holographic object is hidden. In an embodiment, holographic object security program 106 creates the holographic boundary while considering the amount of power required to display the holographic boundary (i.e., holographic object security program 106 preferentially creates a holographic boundary that requires the lowest power but provides adequate blocking). For example, a small, thin boundary uses less power than a tall, thick boundary.

Holographic object security program 106 displays the holographic boundary (step 220). In an embodiment, holographic object security program 106 displays the holographic boundary above the surface of client computing device 104 using holographic projector 108. In an embodiment, holographic object security program 106 displays the holographic boundary such that the user of client computing device 104 can continue to view the holographic object with masked confidential information. In an embodiment, holographic object security program 106 monitors any movement pattern and/or movement direction of the holographic object and re-aligns the placement of the holographic boundary in real-time such that the holographic boundary continues to protect the holographic object from unauthorized viewing. For example, if only one side of the holographic object includes confidential information, then holographic object security program 106 tracks any rotation of the holographic object and causes the holographic boundary to rotate accordingly. In an embodiment, holographic object security program 106 collaborates with one or more other devices (not shown) within a threshold proximity of client computing device 104 in order to have the one or more other devices display a holographic boundary to block the view of the confidential information included in the holographic object from one or more additional directions. In one embodiment, holographic object security program 106 transmits the technical details of the created holographic boundary to the one or more other devices. In another embodiment, each of the one or more other devices creates a holographic boundary, as described in the previous step. This step will be discussed further with respect to FIG. 3B.

Responsive to displaying the holographic boundary, or if holographic object security program 106 determines the content does not include confidential information ("no" branch, decision block 206), then holographic object security program 106 displays the holographic object (step 222). In an embodiment, as discussed with respect to step 212, holographic object security program 106 displays the holographic object in midair, above the surface of client computing device 104 using holographic projector 108. In an embodiment where there is no confidential information associated with the holographic object, then holographic object security program 106 creates the holographic object and displays the object in full view of the surroundings. In an embodiment where there is confidential information associated with the holographic object, then holographic object security program 106 displays the holographic object, or the portion of the holographic object that includes the confidential information, behind the holographic boundary. In an embodiment where the user wants to view the confidential information on only one side of the 3D holographic object at a time, holographic object security program 106 continues to mask the other sides of the holographic object, and the user rotates the holographic object to view the other sides.

Holographic object security program 106 determines power availability and usage of client computing device 104 (step 224). In an embodiment, holographic object security program 106 continually monitors the power available to client computing device 104 before and during the display of the holographic object and/or the holographic boundary as displaying the holographic object/boundary can consume a large amount of power. In an embodiment, holographic object security program 106 monitors the source of the available power. For example, holographic object security program 106 determines whether client computing device 104 is using battery power or is plugged in to a power source. In an embodiment, holographic object security program 106 determines one or more other activities for which the user is using client computing device 104 in parallel with viewing the holographic object/boundary to determine power availability and usage. For example, holographic object security program 106 determines whether the user is also on a conference call while viewing the holographic object/boundary. In an embodiment, holographic object security program 106 predicts the power requirement of client computing device 104. For example, holographic object security program 106 retrieves historical information associated with activities for which the user uses client computing device 104, such as for attending a conference call or using navigation capabilities. Based on factors such as the location of client computing device 104, the calendar of the user, etc., holographic object security program 106 predicts a power requirement of client computing device 104.

Holographic object security program 106 determines whether the power is sufficient for the display of the holographic object (decision block 226). In an embodiment, holographic object security program 106 calculates the power required to display the holographic object and/or the holographic boundary, as well as any additional activities being performed by the user with client computing device 104, and determines whether the available power is sufficient to continue displaying the holographic object and/or the holographic boundary.

If holographic object security program 106 determines the power is not sufficient ("no" branch, decision block 226), then holographic object security program 106 adjusts the display of the holographic object and/or the holographic boundary (step 228). In an embodiment, holographic object security program 106 adjusts one or more display parameters to optimize the power consumption within the available power. Adjustable display parameters may include, but are not limited to, a size of the holographic boundary, a shape of the holographic boundary, a texture of the holographic boundary, and a thickness of the holographic boundary. For example, if holographic object security program 106 is displaying a holographic boundary, then holographic object security program 106 determines whether there are any attributes of the holographic boundary that can be adjusted such that the holographic boundary uses less power, such as a reduction in size, shape, thickness, etc., thus minimizing the power consumption of the holographic boundary while still protecting the confidential information. In another example, if holographic object security program 106 determines client computing device 104 is at low power, holographic object security program 106 can change the display of the holographic object to a two-dimensional display on the display surface of client computing device 104. In an embodiment, if holographic object security program 106 determines the power is not sufficient, holographic object security program 106 notifies the user, via user interface 112, that the power is not sufficient, and offers one or more suggestions to the user to minimize power consumption. For example, holographic object security program 106 may suggest that the user close all other applications in order to continue viewing the holographic object. In another example, holographic object security program 106 may suggest that the user move to a location where there are no unauthorized users such that holographic object security program 106 can discontinue displaying the holographic boundary.

If holographic object security program 106 determines the power is sufficient ("yes" branch, decision block 226), then holographic object security program 106 ends execution.

Figures 3A, 3B:
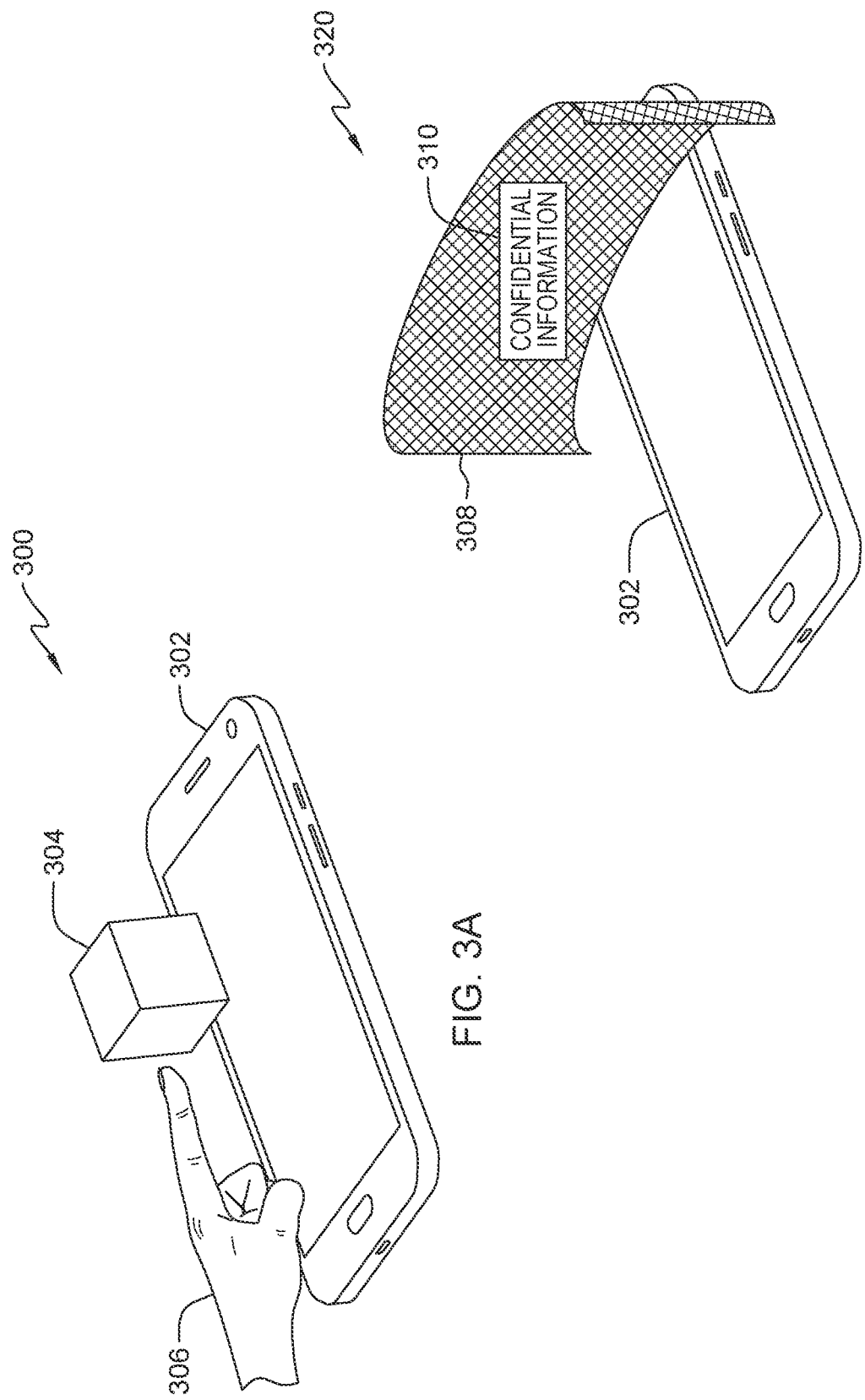
FIG. 3A illustrates an example of an authentication step of the holographic object security program, on the client computing device within the distributed data processing environment of FIG. 1, in accordance with an embodiment of the present invention.
FIG. 3B illustrates an example of a display step of the holographic object security program, on the client computing device within the distributed data processing environment of FIG. 1, in accordance with an embodiment of the present invention.

FIG. 3A illustrates example 300 of an authentication step of holographic object security program 106, on client computing device 104 within distributed data processing environment 100 of FIG. 1, in accordance with an embodiment of the present invention. FIG. 3A includes device 302 which represents client computing device 104 of FIG. 1. FIG. 3A also includes masked holographic object 304 and user 306. As described with respect to steps 214 and 216 of FIG. 2, holographic object security program 106 requested authentication from user 306 and receives the authentication in the form of a fingerprint when the user "touches" masked holographic object 304.

FIG. 3B illustrates example 320 of a display step of holographic object security program 106, on client computing device 104 within distributed data processing environment 100 of FIG. 1, in accordance with an embodiment of the present invention. FIG. 3B includes device 302, as was described with respect to FIG. 3A. FIG. 3B also includes holographic boundary 308 and unmasked holographic object 310. As described with respect to steps 222 and 224 of FIG. 2, holographic object security program 106 displays holographic boundary 308 and then displays unmasked holographic object 310 visible only to user 306 upon successful authentication.

Figure 4:
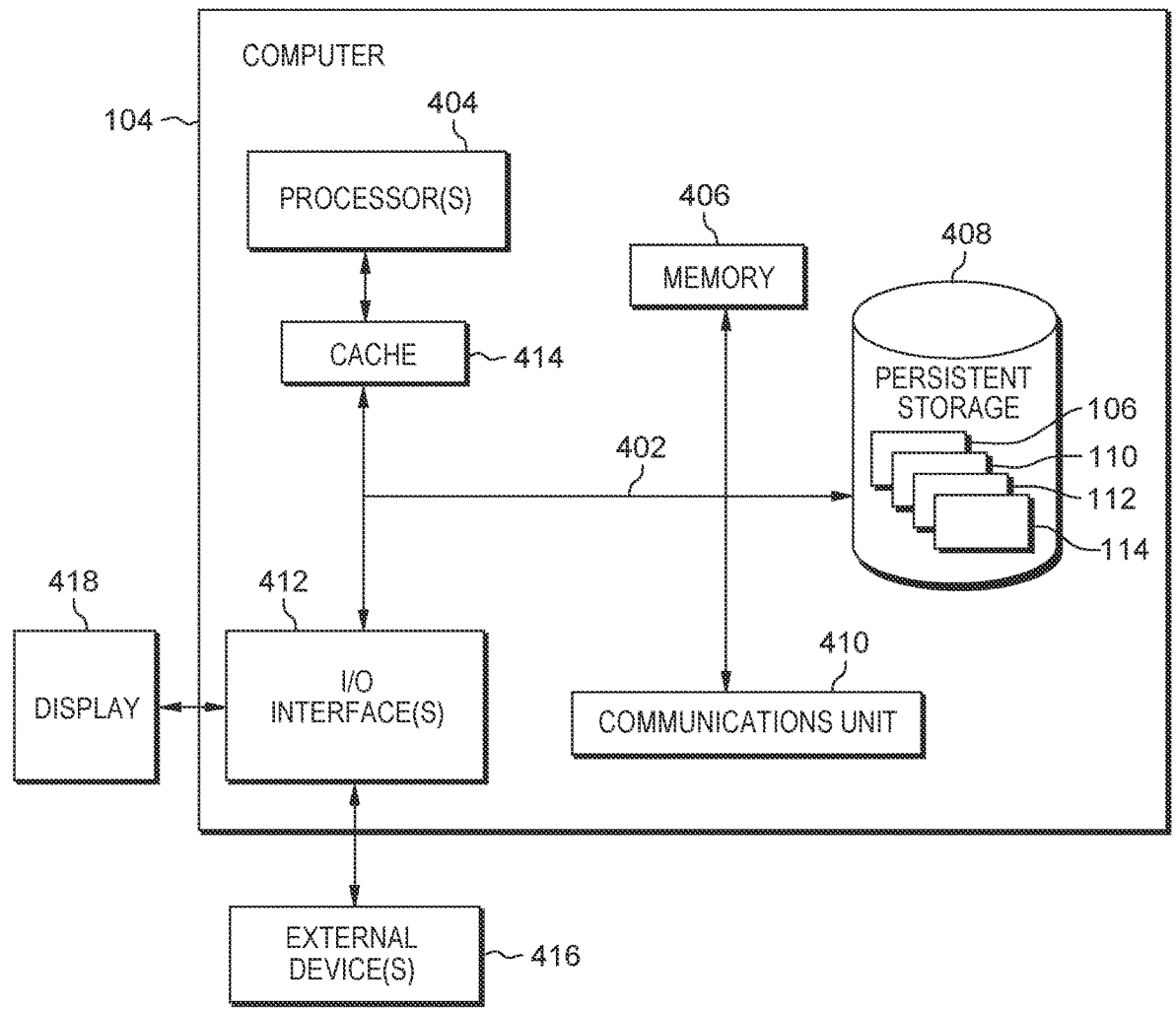
FIG. 4 depicts a block diagram of components of the client computing device executing the holographic object security program within the distributed data processing environment of FIG. 1, in accordance with an embodiment of the present invention.

FIG. 4 depicts a block diagram of components of client computing device 104 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Client computing device 104 can include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., holographic object security program 106, authentication module 110, user interface 112, and content database 114, are stored in persistent storage 408 for execution and/or access by one or more of the respective processor(s) 404 of client computing device 104 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of wearable device 116. In these examples, communications unit 410 includes one or more network interface cards. Communications unit 410 may provide communications through the use of either or both physical and wireless communications links. Holographic object security program 106, authentication module 110, user interface 112, content database 114, and other programs and data used for implementation of the present invention, may be downloaded to persistent storage 408 of client computing device 104 through communications unit 410.

I/O interface(s) 412 allows for input and output of data with other devices that may be connected to client computing device 104. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention, e.g., holographic object security program 106, authentication module 110, user interface 112, and content database 114 on client computing device 104, can be stored on such portable computer readable storage media and can be loaded onto persistent storage 408 via I/O interface(s) 412. I/O interface(s) 412 also connect to display 418.

Display 418 provides a mechanism to display data to a user and may be, for example, a computer monitor. Display 418 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing descriptions of the various embodiments of the present invention have been presented for purposes of illustration and example, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    identifying, by one or more computer processors, content within a request to display a holographic object to be moved to a holographic object;
    determining, by one or more computer processors, the content includes confidential information;
    requesting, by one or more computer processors, authentication from the user;
    receiving, by one or more computer processors, the authentication from the user;
    creating, by one or more computer processors, a holographic boundary, wherein the holographic boundary only blocks a portion of the holographic object that contains the confidential information from being viewed by one or more unauthorized users;
    displaying, by one or more computer processors, the holographic boundary;
    displaying, by one or more computer processors, the holographic object in association with the device;
    determining, by one or more computer processors, a power availability and a power usage of the device;
    determining, by one or more computer processors, the power availability of the device is not sufficient to display the holographic object and the holographic boundary; and
    responsive to the power availability of the device not being sufficient to display the holographic object and the holographic boundary, adjusting, by one or more computer processors, one or more display parameters associated with the holographic boundary.

2. The computer-implemented method of claim 1, further comprising:
    masking, by one or more computer processors, the confidential information;
    creating, by one or more computer processors, the holographic object with the masked confidential information; and
    displaying, by one or more computer processors, the holographic object with the masked confidential information.

3. The computer-implemented method of claim 1, wherein the one or more display parameters include a size of the holographic boundary, a shape of the holographic boundary, a texture of the holographic boundary, and a thickness of the holographic boundary.

4. The computer-implemented method of claim 1, wherein requesting the authentication from the user further comprises:
    requesting, by one or more computer processors, the user to act as if the user is touching the holographic object in order to provide a fingerprint of the user.

5. The computer-implemented method of claim 1, wherein requesting the authentication from the user further comprises:
    requesting, by one or more computer processors, a fingerprint of the user; and
    requesting, by one or more computer processors, a signal from a wearable device of the user.

6. The computer-implemented method of claim 1, wherein displaying the holographic object in association with the device further comprises:
    displaying, by one or more computer processors, the holographic object in midair, above a surface of the device.

7. A computer program product comprising:
    one or more computer readable storage media and program instructions collectively stored on the one or more computer readable storage media, the stored program instructions comprising:
        program instructions to identify content within a request to display a holographic object to be moved to a holographic object; program instructions to determine the content includes confidential information; program instructions to request authentication from the user;
        program instructions to receive the authentication from the user;
        program instructions to create a holographic boundary, wherein the holographic boundary only blocks a portion of the holographic object that contains the confidential information from being viewed by one or more unauthorized users;
        program instructions to display the holographic boundary;
        program instructions to display the holographic object in association with the device;
        program instructions to determine, by one or more computer processors, a power availability and a power usage of the device;
        program instructions to determine, by one or more computer processors, the power availability of the device is not sufficient to display the holographic object and the holographic boundary; and
        responsive to the power availability of the device not being sufficient to display the holographic object and the holographic boundary, program instructions to adjust, by one or more computer processors, one or more display parameters associated with the holographic boundary.

8. The computer program product of claim 7, the stored program instructions further comprising:
    program instructions to mask the confidential information;
    program instructions to create the holographic object with the masked confidential information; and
    program instructions to display the holographic object with the masked confidential information.

9. The computer program product of claim 7, wherein the one or more display parameters include a size of the holographic boundary, a shape of the holographic boundary, a texture of the holographic boundary, and a thickness of the holographic boundary.

10. The computer program product of claim 7, wherein the program instructions to request the authentication from the user comprise:

program instructions to request the user to act as if the user is touching the holographic object in order to provide a fingerprint of the user.

11. The computer program product of claim 7, wherein the program instructions to request the authentication from the user comprise:
   program instructions to request a fingerprint of the user; and
   program instructions to request a signal from a wearable device of the user.

12. The computer program product of claim 7, wherein the program instructions to display the holographic object in association with the device comprise:
   program instructions to display the holographic object in midair, above a surface of the device.

13. A computer system comprising: one or more computer processors;
   one or more computer readable storage media;
   program instructions collectively stored on the one or more computer readable storage media for execution by at least one of the one or more computer processors, the stored program instructions comprising:
      program instructions to identify content within a request to display a holographic object to be moved to a holographic object; program instructions to determine the content includes confidential information; program instructions to request authentication from the user;
      program instructions to receive the authentication from the user;
      program instructions to create a holographic boundary, wherein the holographic boundary only blocks a portion of the holographic object that contains the confidential information from being viewed by one or more unauthorized users;
      program instructions to display the holographic boundary;
      program instructions to display the holographic object in association with the device;
      program instructions to determine, by one or more computer processors, a power availability and a power usage of the device;
      program instructions to determine, by one or more computer processors, the power availability of the device is not sufficient to display the holographic object and the holographic boundary; and
      responsive to the power availability of the device not being sufficient to display the holographic object and the holographic boundary, program instructions to adjust, by one or more computer processors, one or more display parameters associated with the holographic boundary.

14. The computer system of claim 13, the stored program instructions further comprising:
   program instructions to mask the confidential information;
   program instructions to create the holographic object with the masked confidential information; and
   program instructions to display the holographic object with the masked confidential information.

15. The computer system of claim 13, wherein the program instructions to request the authentication from the user comprise:
   program instructions to request the user to act as if the user is touching the holographic object in order to provide a fingerprint of the user.

16. The computer system of claim 13, wherein the program instructions to request the authentication from the user comprise:
   program instructions to request a fingerprint of the user; and
   program instructions to request a signal from a wearable device of the user.

17. The computer system of claim 13, wherein the program instructions to display the holographic object in association with the device comprise:
   program instructions to display the holographic object in midair, above a surface of the device.

* * * * *